Jan. 10, 1956 E. REED 2,730,601
RESISTANCE WELDING MACHINE FOR SHEET
Filed Nov. 3, 1950 5 Sheets-Sheet 1

Inventor
ED REED,
Allen & Allen
Attorneys.

Inventor
ED REED,
Allen & Allen
Attorneys.

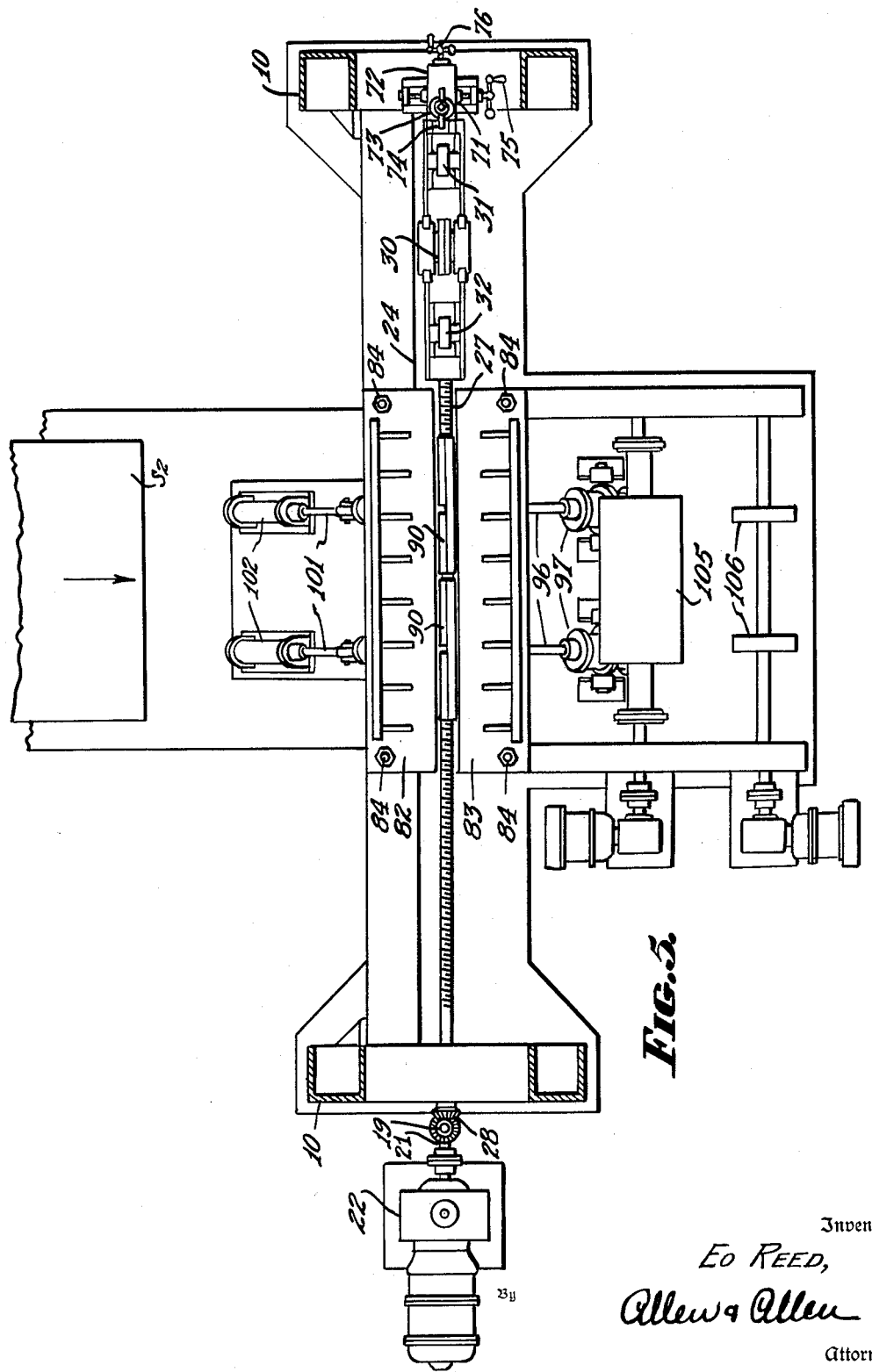

United States Patent Office 2,730,601
Patented Jan. 10, 1956

2,730,601

RESISTANCE WELDING MACHINE FOR SHEET

Eo Reed, Middletown, Ohio, assignor to Armco Steel Corporation, Middletown, Ohio, a corporation of Ohio Application November 3, 1950, Serial No. 193,941

9 Claims. (Cl. 219—10)

This invention relates to a resistance welding apparatus for welding metal sheets end to end to form a strip.

It is the general object of my invention to provide a machine by means of which successive sheets may be welded end to end to form a strip in an expeditious manner. In this connection the objects of my invention include the provision of a machine through which the sheets are passed, together with means for aligning the adjacent ends of succeeding sheets and clamping them in position for welding and the provision of a resistance welding wheel and backing-up roller for concurrently passing along the butted edges to perform a weld together with opposed rollers for rolling down the seam produced by the welding instrumentality.

It is among the objects of my invention to provide means for clamping the trailing edge of one sheet and the leading edge of a succeeding sheet in butting relation with the butt joint being slightly above the plane of the sheets so that when the welding instrumentality makes its welding pass in the plane of the sheets the butted edges are compressed, thereby producing an improved weld.

In this connection another object of the invention is the provision of a forming guide bar for positioning the butted sheets with their adjacent edges at a slight angle to each other.

Yet another object of the invention resides in a method of butt welding sheets end to end involving a certain series of steps whereby there is produced a more perfect weld in a more expeditious manner.

These and various other objects of the invention which will be apparent to one skilled in the art upon reading these specifications I accomplish by that certain construction and arrangement of parts of which I shall now describe certain exemplary embodiments and by that sequence of method steps which will be disclosed hereinafter.

Reference is made to the drawings forming a part hereof and in which:

Figure 5 is a cross sectional view of the same taken on the line 5—5 of Figure 1 with portions as seen in plan;

Figures 3, 4:
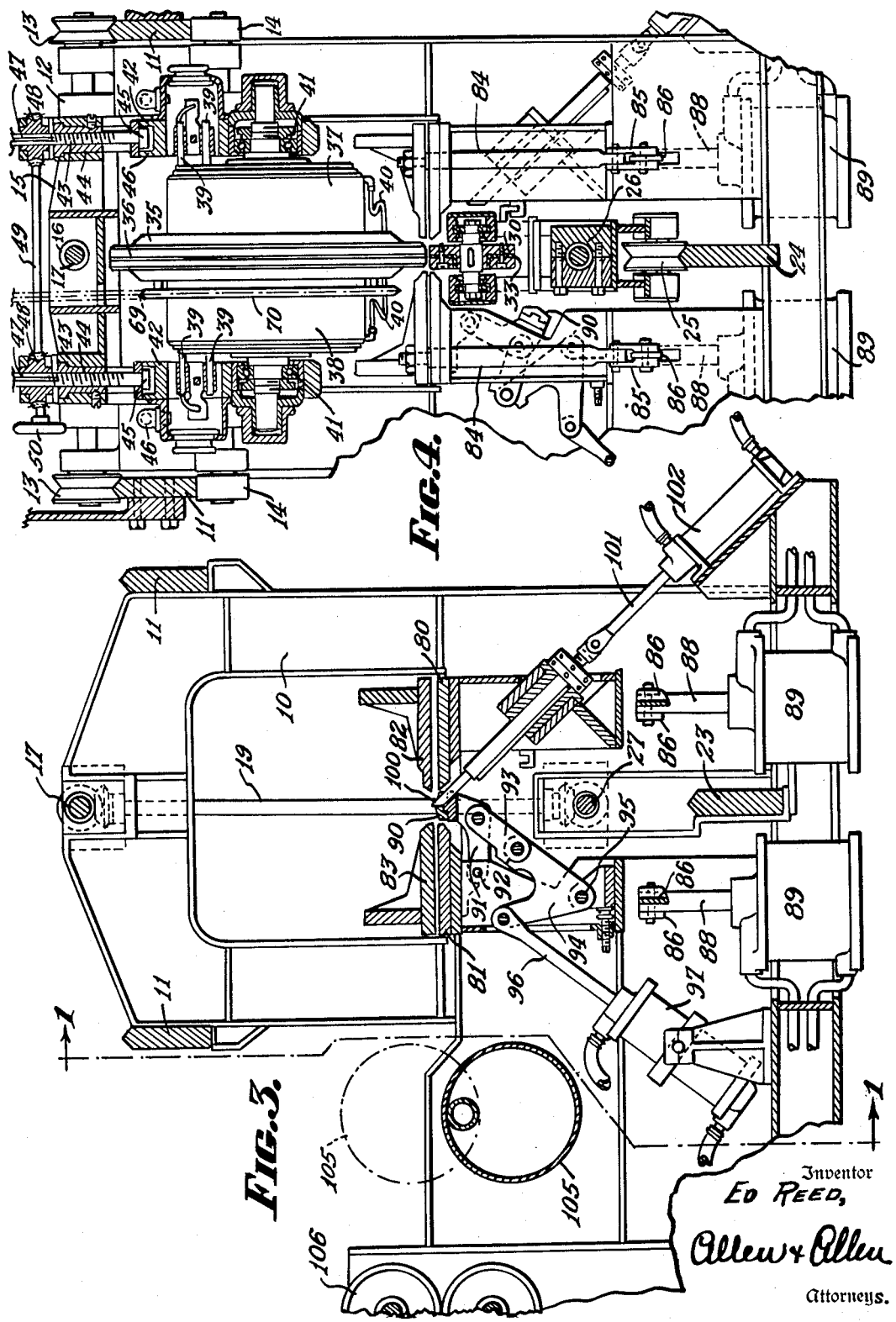
Figure 3 is a cross sectional view of the machine taken on the line 3—3 of Figure 1.
Figure 4 is a cross sectional view of the same taken on the line 4—4 of Figure 1.

Figures 6 to 11 inclusive are semi-diagrammatic views similar to Figure 3 showing a succession of positions of the parts during a welding operation.

In the practice of welding sheets together to form a strip it has been an almost universal custom to use a flame welding technique. According to the present invention I depart from this technique and employ a resistance electrical welding technique. Reference is made to Patent 2,132,196 of October 4, 1938, in the name of Edmund J. von Henke wherein there is disclosed a welding wheel for welding pipe. The welding wheel according to the von Henke patent is rotated on a stationary axis and the pipe is moved past the welding wheel with the welding wheel rolling over the pipe.

According to the present invention I make use of a transformer similiar to that disclosed in the von Henke patent, but I mount the transformer or welding wheel, as it will be referred to hereinafter, for movement along a welding path line, and I provide backing-up means which move simultaneously to back up the welding wheel.

Figures 1, 2:
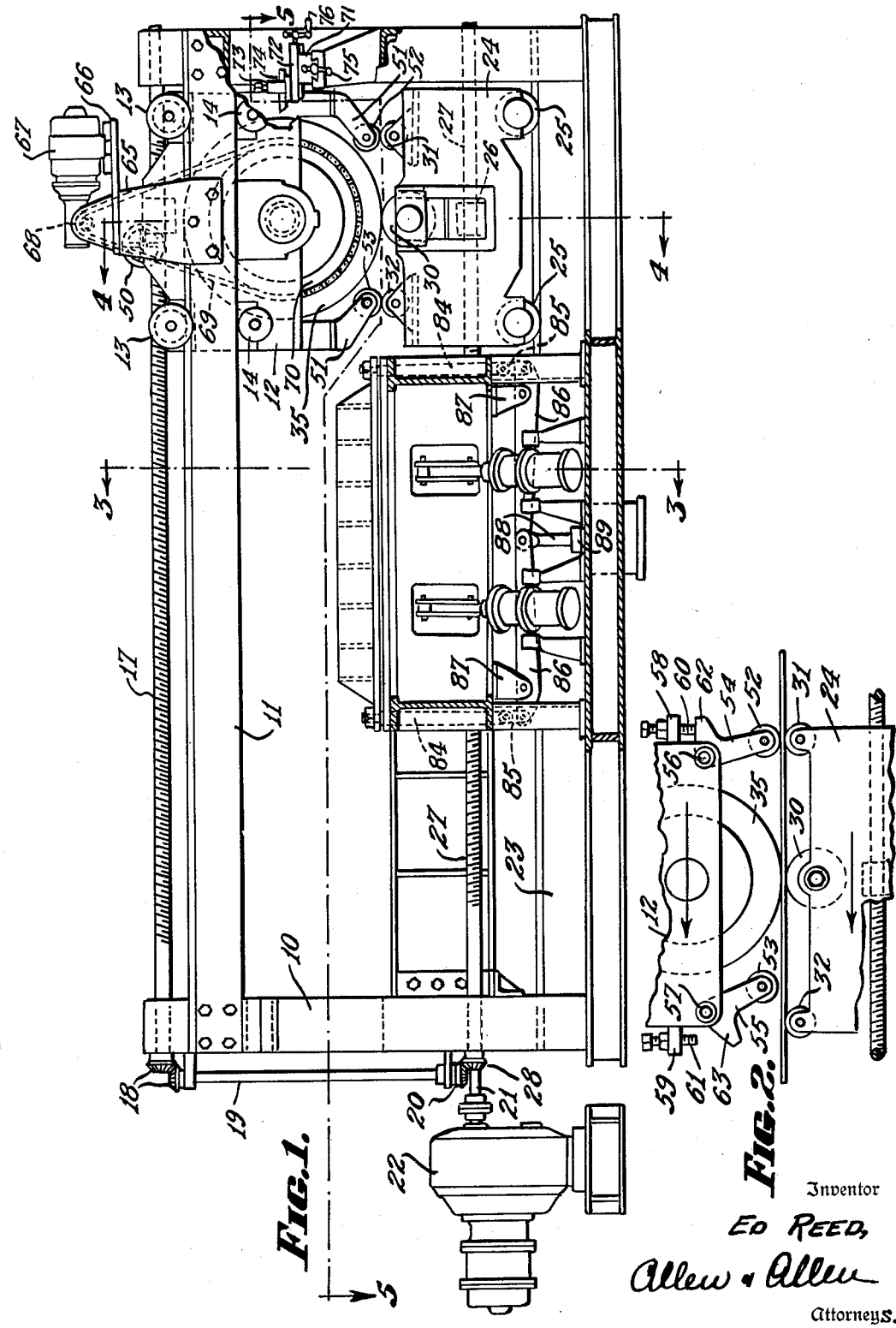
Figure 1 is a cross sectional view taken on the line 1—1 of Figure 3 of a machine according to my invention.
Figure 2 is a fragmentary view similar to Figure 1 showing a modification thereof.

Referring now to Figure 1, I provide a frame indicated generally at 10 having upper rail members 11 secured thereto. A carriage indicated generally at 12 is arranged to ride on the rails 11 by means of wheels 13. Additional wheels 14 are arranged to engage the under side of the rail 11 to take any upward thrust on the carriage 12. The carriage 12 has a cross beam 15 provided with a threaded hole 16 through which passes the lead screw 17 which is journaled in the frame 10 at its ends and which is driven through a pair of bevel gears 18 from a shaft 19. The shaft 19 is driven through a bevel gear 20 from the shaft 21 of the motor and speed reducer indicated generally at 22.

In the lower part of the machine there is provided a rail 23 upon which rides a carriage indicated generally at 24 by means of wheels 25. The carriage 24 is provided with a nut 26 which engages with the lead screw 27 which extends across the frame and is provided with the bevel gear 28 which engages the bevel gear 20 previously mentioned. From the foregoing description it will be clear that the motor 22 drives the lead screws 17 and 27 at the same time and in the same direction so that if the two screws 17 and 27 have the same pitch the carriages 12 and 24 will be caused to traverse the machine simultaneously and at the same speed.

The carriage 24 is provided with journaling means for a backing-up roller 30 and two supplementary rollers 31 and 32. The rollers 30, 31 and 32 are substantially in the same plane and their peripheries are tangent to the horizontal plane of the lower side of the sheets to be welded. The wheel 30 may be considered as the welding backing-up roller, while the wheels 31 and 32 may be considered as the rolling backing-up rollers. The wheel 30, as best seen in Figure 4, is in two sections with insulating material 33 inbetween to prevent flow of current from one face to the other of the wheels. When the wheels 30, 31 and 32 are aligned as above set forth they are not normally adjusted thereafter.

The upper carriage 12 is provided with the welding wheel indicated generally at 35. The wheel 35 is also made in two sections with insulating material between as at 36, and welding transformers are provided at 37 and 38. The construction of the welding wheel proper will not be described in detail and reference may be had to the above mentioned von Henke patent for constructional details. It will be understood that contact brushes for the transmission of current to the transformers are provided at 39 and that conduits for coolant are provided as at 40.

The welding wheel 35 is journaled as indicated generally at 41 in supplementary frame members 42 which are supported from the frame 12 as will now be described.

The frame 15 is provided with the nuts 43 through which pass the screws 44. The screws 44 are provided with the heads 45 which are seated in the T-slots 46 in the frames 42. It will be observed that clearance is provided below the heads 45 so that the journals 41 and the welding wheel 35 may be lifted slightly with respect to the carriage 12. The height of the welding wheel can be adjusted since the upper ends of the screws 44 are splined as at 47 and pass through the worm wheels 48. Worms (not shown) on the shaft 49 engage the worm wheels 48 so that by rotating the hand wheel 50 secured to the end of the shaft 49 the screws 44 can be rotated to raise or lower the frame members 42, thereby raising or lowering the welding wheel 35. In practice the welding wheel 35 is positioned so that its lower periphery is below the plane of the upper surface of the sheets to be welded so that when it passes over the butted sheets it is slightly raised to take its weight off the screws 44. Thus during the welding pass the entire weight of the welding wheel and its associated parts is on the butted edges which are being welded.

Secured to the carriage 12 are the brackets 51 carrying the rollers 52 and 53 which are respectively positioned in vertical alignment with the rollers 31 and 32. The function of these rollers is to roll down the seam which has been produced by the welding wheel. When the welding wheel is moving toward the left to perform its welding pass (as seen in Figure 1) the rollers 52 and 31 which are trailing the welding wheel roll down the weld. When the welding wheel is moving toward the right in Figure 1 in performing its welding pass the rollers 53 and 32 roll down the seam.

In Figure 2 I have shown a slight modification where only that one of the rollers 52 and 53 which is actually rolling a seam is in operative position. As there shown, the rollers 52 and 53 are mounted on bellcrank members 54 and 55 which are pivoted to the carriage 12 at 56 and 57 respectively. Brackets 58 and 59 are provided with adjusting screws 60 and 61 which in one position of the members 54, 55 contact the short arm 62 or 63 thereof. When the carriage 12 is moving toward the left as seen in Figure 2 the link 55 swings as shown so that the roller 53 is in inoperative position, while the roller 52 is brought into operative position by a toggle-like action and its rotation in a counterclockwise direction is limited by the abutment of the portion 62 against the adjusting screw 60. Upon movement of the carriage 12 toward the right of Figure 2, the link 54 will rock in a clockwise direction to inoperative position while the link 55 will rock in a clockwise direction until the portion 63 abuts the adjusting screw 61 whereupon the wheel 53 will be vertically aligned with the wheel 32 so as to roll down the seam.

Because of the fact that the welding wheel 35 must be dressed from time to time I have provided means for dressing it without removing it from the machine. On a bracket 65 secured to the frame 11 there is provided a platform 66 for a small motor 67. The motor through a speed reducer drives a sprocket 68 and its rotation is transmitted by a chain 69 to a large sprocket 70 associated with the welding wheel 35. The bracket 65 is adjacent one end of the machine where the carriage 12 is at one end of its travel. On the frame 11 there is provided a cross slide for a lathe tool indicated generally at 71 and the member 71 carries a slide at right angles thereto at 72. The member 72 carries a conventional tool post 73 in which may be mounted a lathe tool 74. When the wheel 35 needs dressing, the carriage 12 is moved to one end of its travel as shown in Figure 1 and the sprocket 69 is positioned over the sprockets 68 and 70. Thereupon the wheel 35 may be driven by the motor and gear reducer 67. The wheel may then be dressed as is well known by means of the lathe tool 74 which is controlled by the hand wheels 75 and 76. When the dressing job has been completed the sprocket is removed and the carriage can then again traverse its path upon rotation of the motor 22.

As best seen in Figure 3, there are provided in the frame 10 the usual clamping tables 80 and 81. Associated with the clamping tables 80 and 81 are the clamping plates 82 and 83 respectively. These plates are secured at their ends to the rods 84 and the rods in turn are connected at their lower ends through the links 85 to the levers 86. The levers 86 are pivoted to brackets 87 and at their inner ends are pivotally connected to the plungers 88 of the air pistons operating in the cylinders 89. From the foregoing remarks it will be clear that when pressure is applied to the air cylinders 89 the plungers 88 are raised, thereby raising the inner ends of the levers 86 whereby downward pull is applied to the rods 84 and the clamping plates 82 and 83.

To assist in positioning the sheet edges prior to the welding operation there are provided the forming guide bars 90 of which in the present embodiment there are two. The guide bars 90 are mounted on the curved levers 91 which are pivoted to the frame as at 92. The levers 91 are connected by means of links 93 to the bellcrank levers 94 which are pivoted to the frame at 95. The other arms of the bellcrank levers 94 are pivoted to the plungers 96 of the air pistons operating in the cylinders 97. The position of the parts shown in Figure 3 is the operative position of the guide forming bars 90, and it will be clear that when the plungers 96 are retracted the bellcrank levers 94 will be rocked counterclockwise and will through the links 93 pull the levers 91 downwardly to the position shown in Figure 4. The function of the guide forming bars 90 will be described in more detail hereinafter.

Aligning pins are provided at 100 and these are simply operated in an axial direction by connection with the plungers 101 secured to pistons operating in the cylinders 102 so that by actuation of the pistons in the cylinders 102 the aligning bars 100 may be moved from their operative position of Figure 3 to their inoperative position shown in broken lines in Figure 4.

A looper roller is provided at 105 and such a looper is disclosed and claimed in the Reed and Mizer Patent No. 2,196,941 to which reference is made for details of its construction. Beyond the looper roll there are provided the usual pinch rolls 106 for feeding the strip forward.

For a detailed description of the operation of the parts just described and the method in question reference is now made to Figures 6 to 11 inclusive.

Figure 6:
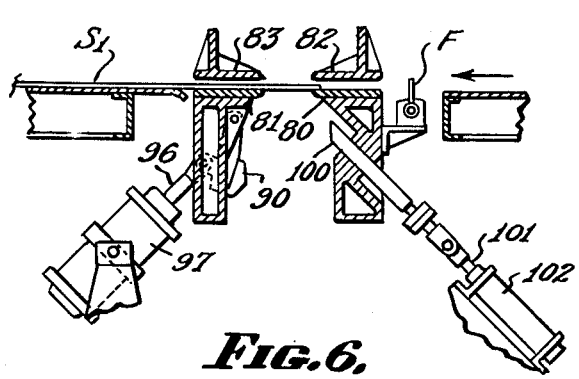
Figure 7:
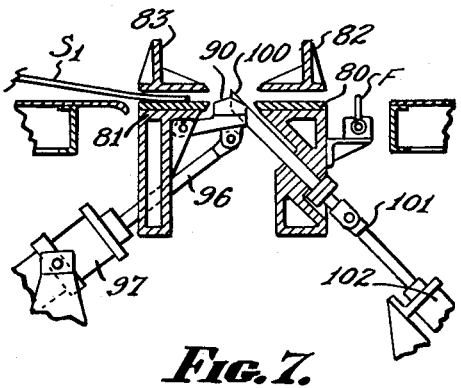
Figure 8:
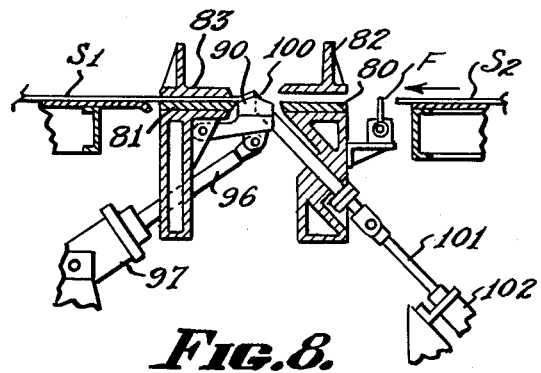
Figure 9:
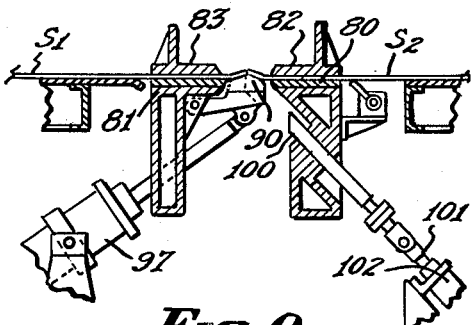

In Figure 6 the forming guide 90 and the aligning pins 100 are shown in retracted position. A sheet $S_1$ has moved over the clamping tables 80 and 81 in the direction of the arrow and in so doing has passed over the switch finger F. By means of electrical connections well known in the art the movement of the switch finger F from the dotted line position to the full line position stops the rotation of the pinch rolls which now acts as a temporary clamp for the strip. The looper roll 105 now operates to further retract the strip to the position shown in Figure 7 whereupon the forming guide bar 90 and the aligning pins 100 are energized to move to the position shown in Figure 7. The looper roll now continues its movement and releases the sheet $S_1$ which is still being clamped in the pinch rolls so that the sheet $S_1$ slips backward against the aligning pins 100 and over the forming guide bars 90. Thereupon the clamping plate 83 is actuated to clamp the sheet $S_1$ and the parts are in the position shown in Figure 8.

The succeeding sheet $S_2$ is then moved forwardly in the direction of the arrow while the aligning pins 100 are withdrawn. The sheet $S_2$ is moved up over the other inclined surface of the forming guide bar 90 until it abuts the trailing edge of the sheet $S_1$. At this point the clamping plate 82 is actuated to clamp the succeeding sheet and the parts will now be in the position shown in Figure 9.

Figure 10:
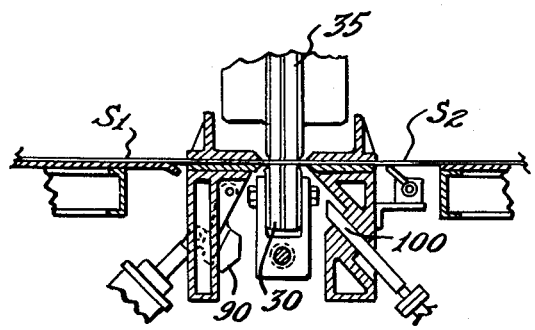
Figure 11:
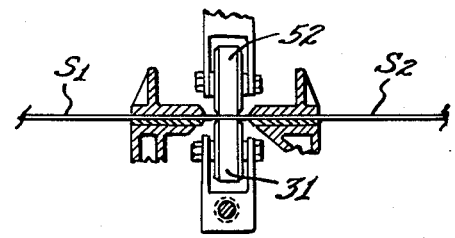
Figure 12:
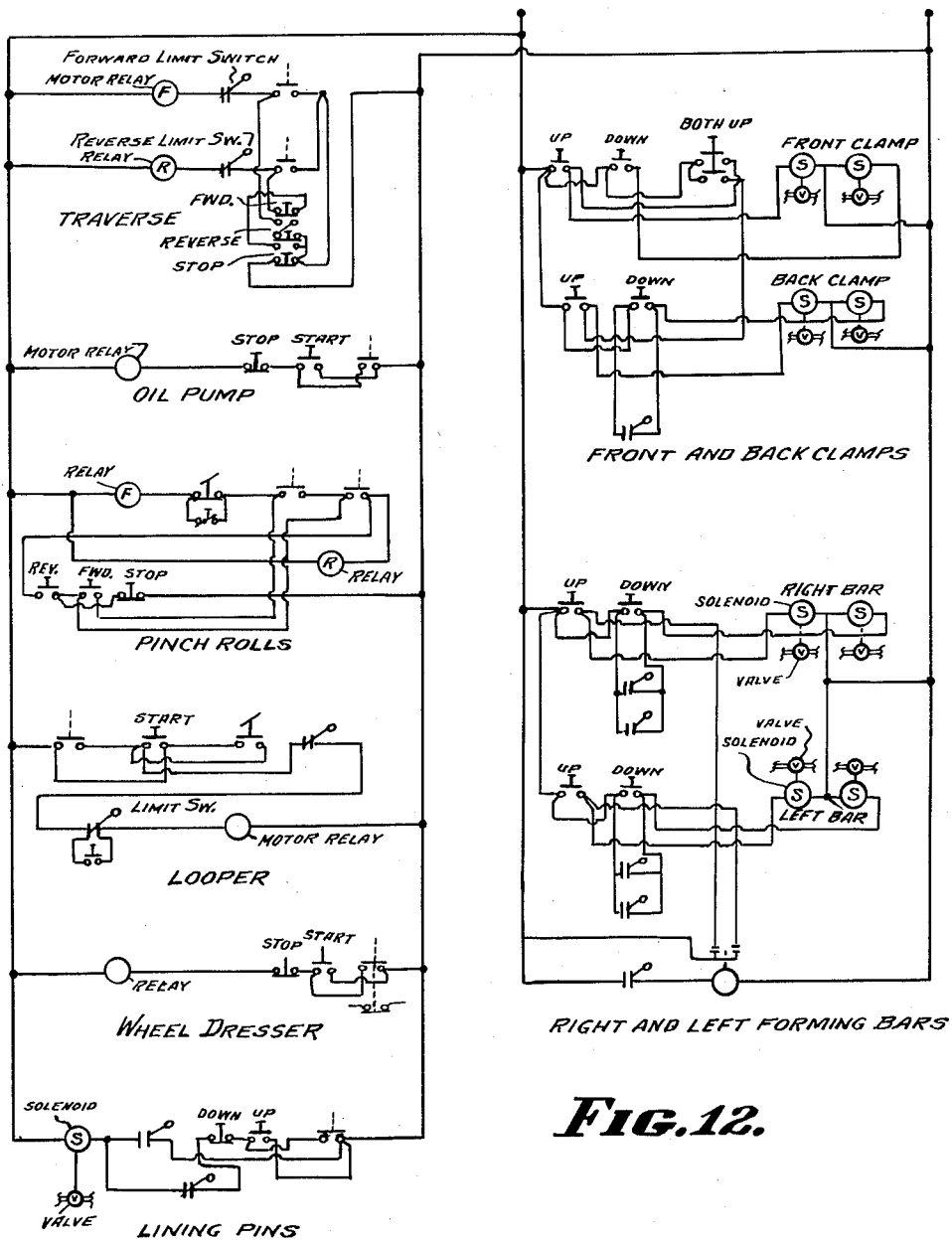

The forming guide bars 90 are then withdrawn and the motor 22 is energized to cause movement of the carriages 12 and 24 over the welding path line as shown in Figure 10. At the same time current is fed to the welding wheel 35 and the abutting edges of the sheets $S_1$ and $S_2$ are welded together. Since the trailing and leading edges respectively of the sheets $S_1$ and $S_2$ were elevated with respect to the plane of the sheets by the forming guide bars 90 and since the welding wheel 35 and backing-up roller 30 contact the abutting edges in the plane of the sheets, additional pressure is put on the edges being welded together and a more perfect weld is achieved.

Immediately behind the welding instrumentality there follow the seam rolling rollers 52 and 31 and these rollers roll down the seam which has been produced by the welding wheel. The final result is that the thickness of the seam is equal to the thickness of the sheets themselves. This is very useful in connection with electrical steel for the punching of core laminations and the like in that individual laminae may cross a seam without affecting the electrical properties of the final product.

The amount by which the abutting edges are raised above the plane of the sheets need not be large and will vary with conditions encountered in practice. Generally speaking, in connection with 24 gauge sheet for example an elevation of about $\frac{1}{32}$ inch will be found to be suitable. It will be within the skill of the man working in the art to determine for each gauge and type of steel the amount of elevation which is desirable.

It will be understood that numerous modifications may be made without departing from the spirit of my invention and I therefore do not intend to limit myself in any manner other than as set forth in the claims which follow.

Having now fully described my invention, what I claim as new and desire to secure by Letters Patent is:

1. A machine for welding metal sheets end to end to form a strip, comprising a frame, transverse rails in the upper part of said frame, a carriage arranged to ride on said transverse rails, a resistance welding wheel of substantial weight rotatably suspended from said carriage with its periphery extending below the sheet pass line, said suspension having vertical clearance to permit said wheel to be raised with respect to said carriage by the thickness of a sheet passing thereunder, whereby during a welding pass the seam is subjected to the entire weight of said welding wheel, a lower rail and a second carriage arranged to ride on said lower rail and carrying a backing-up roller for said welding wheel, means for producing concurrent movement of said carriages along their respective rails at equal speeds, the first mentioned carriage being provided with a supplementary roll substantially in the same plane as said welding wheel to the trailing side thereof in terms of the direction of movement of said welding wheel, and said second carriage being provided with a supplementary roll in the plane of said backing-up roller and in substantially vertical alignment with said first mentioned supplementary roll, said supplementary rolls serving to roll down the seam produced by said welding wheel.

2. A machine according to claim 1, in which the first mentioned carriage is provided with supplementary rolls one on each side of said welding wheel and substantially in the same plane as said welding wheel, and said second carriage is provided with supplementary rolls in the plane of said backing-up roller and in substantially vertical alignment with said first mentioned supplementary rolls respectively, there being thus a pair of upper and lower rolls trailing said welding wheel and backing-up roller in either direction of movement of said carriages, for rolling down the seam produced by said welding wheel.

3. A machine according to claim 2, in which said first mentioned supplementary rolls are mounted on pivoted links, and in which stop means are provided for said links to limit their pivotal movement in a trailing direction in terms of the direction of movement of said welding wheel, to a position in which they are in substantially vertical alignment with the respective second mentioned supplementary roll, to roll down the seam produced by said welding wheel, said links being free to pivot in the opposite direction to permit the said first mentioned supplementary rolls which are leading in terms of the direction of movement of said welding wheel to swing free.

4. In a machine for welding metal sheets end to end to form a strip, a forming guide bar having an upper surface composed of two longitudinal plane surfaces meeting along a substantially central longitudinal line, said surfaces in cross-section constituting a shallow inverted V, means for positioning said bar above the welding pass line and under the abutting ends of two sheets to be welded to cause said ends to be elevated slightly prior to clamping, means for clamping said sheets in the plane of the pass line, and means for removing said bar from under said ends after clamping, for a welding pass.

5. In a machine for welding metal sheets end to end to form a strip, said machine having clamping means for the trailing end of one sheet, and clamping means for the leading end of a succeeding sheet, aligning means for the trailing end of said one sheet to position the trailing end of said one sheet at the welding pass line, means for moving said aligning means to operative position after the said trailing end has passed said welding pass line, means for backing said trailing end against said aligning means and clamping said trailing end in aligned position, means for moving said aligning means away from operative position, means for bringing a succeeding sheet into butting relation with said trailing end, means for clamping said succeeding sheet in position, and means positioned under said sheet ends and above said welding pass line during alignment and clamping to elevate the butted edges slightly above the welding pass line, and removed from the pass line after clamping, so that the butted edges will be flattened and the seam will be compressed during the welding pass at the welding pass line.

6. In a machine for welding metal sheets end to end to form a strip, having a resistance welding wheel arranged to move over butted strip edges in rolling contact therewith to form a weld, and a backing-up roller arranged to move simultaneously under said butted strip edges in rolling contact therewith to support and back up said welding wheel, spaced clamping means for the adjacent edges of two successive sheets, means movable to a position between said clamping means for aligning the trailing edge of one sheet in the vertical plane of said welding wheel, and movable to an out of the way position to permit passage of a succeeding sheet, and means for slightly elevating the butted trailing edge of one sheet and leading edge of a succeeding sheet above the plane of said sheets prior to clamping, whereby, in cross-section, said butted edges assume the shape of a shallow inverted V.

7. The method of welding metal sheets end to end to form a strip, which includes the steps of aligning a sheet with its trailing edge in the vertical plane of the pass line of a welding instrumentality and slightly elevated above the plane of said sheet, butting the leading edge of a succeeding sheet against said trailing edge, the said leading edge being also slightly elevated above the plane of said sheet, clamping said trailing and leading edges in position and causing said welding instrumentality to perform a welding pass while forcing said butted edges into the plane of said sheets.

8. The method of welding metal sheets end to end to form a strip, which includes the steps of aligning a sheet with its trailing edge in the vertical plane of the pass line of a welding instrumentality and slightly elevated above the plane of said sheet, butting the leading edge of a succeeding sheet against said trailing edge, the said leading edge being also slightly elevated above the plane of said sheet, clamping said trailing and leading edges in position, causing said welding instrumentality to perform a welding pass while forcing said butted edges into the plane of said sheets, and immediately rolling the seam produced by said welding instrumentality to cause the thickness of the seam to be equal to the thickness of the sheets being welded.

9. The method of welding metal sheets end to end to form a strip, which includes the steps of bringing a leading edge of a sheet into abutment with a trailing edge of a preceding sheet, while deforming said leading and trailing edges out of the plane of said sheets, clamping said sheets, establishing a resistance welding circuit through said abutting edges of said sheets and applying current thereto while forcing them back into the plane of said sheets, and moving said circuit along said abutting edges.

References Cited in the file of this patent

UNITED STATES PATENTS

| | | | |
|---|---|---|---|
| 1,401,448 | Shea | Dec. 27, | 1921 |
| 2,023,086 | Lavalee | Dec. 3, | 1935 |
| 2,024,485 | Sussman | Dec. 17, | 1935 |
| 2,181,502 | Biggert | Nov. 28, | 1939 |
| 2,198,265 | Caputo | Apr. 23, | 1940 |
| 2,356,643 | Allshouse | Aug. 22, | 1944 |
| 2,459,625 | Copp | Jan. 18, | 1949 |